(12) United States Patent
Rockarts et al.

(10) Patent No.: US 7,303,377 B2
(45) Date of Patent: Dec. 4, 2007

(54) APPARATUS AND METHOD OF BALANCING A SHAFT

(75) Inventors: Sean André Rockarts, Mississauga (CA); Barry Barnett, Toronto (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 279 days.

(21) Appl. No.: 10/823,591

(22) Filed: Apr. 14, 2004

(65) Prior Publication Data

US 2005/0231052 A1    Oct. 20, 2005

(51) Int. Cl.
*F01D 5/10* (2006.01)
(52) U.S. Cl. .................................... 416/144
(58) Field of Classification Search ............... 415/118, 415/119, 218.1, 219.1; 416/144, 145, 61, 416/500, 244 A, 244 B, 245 R, 245 A; 29/407.01, 29/407.05, 407.07, 889.1, 889.21; 73/468, 73/470; 74/573.1, 573.11, 573.12, 573.13, 74/572.1, 572.4, 572.11; 411/183–185, 265, 411/270, 180–181; 464/180
See application file for complete search history.

(56) References Cited

U.S. PATENT DOCUMENTS

| | | | |
|---|---|---|---|
| 1,878,907 A * | 9/1932 | Staats, Jr. ............... 416/245 R |
| 2,140,017 A | 12/1938 | Koch | |
| 2,421,514 A * | 6/1947 | Martin et al. .................. 416/34 |
| 2,685,320 A * | 8/1954 | Rosan ......................... 411/180 |
| 2,861,471 A | 11/1958 | Kronenberg | |
| 2,964,972 A | 12/1960 | Lindsey et al. | |
| 3,362,251 A | 1/1968 | Francis | |
| 3,556,533 A | 1/1971 | Hollis ......................... 273/171 |
| 3,990,814 A * | 11/1976 | Leone ..................... 416/245 R |
| 4,107,257 A | 8/1978 | Swin, Sr. ...................... 264/328 |
| 4,667,532 A * | 5/1987 | Holz et al. ................. 74/571.1 |
| 4,716,761 A | 1/1988 | Ito et al. ..................... 73/118.1 |
| 4,842,485 A | 6/1989 | Barber ....................... 416/144 |
| 4,889,011 A | 12/1989 | Steahly ........................ 74/604 |
| 5,033,923 A * | 7/1991 | Osawa ......................... 464/180 |
| 5,205,189 A | 4/1993 | Wesling et al. ........... 74/573 R |
| 5,235,228 A | 8/1993 | Nakanura et al. ............. 310/51 |
| 5,280,736 A | 1/1994 | Wesling et al. | |
| 5,285,700 A | 2/1994 | Lau ........................... 74/573 R |
| 5,295,411 A | 3/1994 | Speckhart ..................... 74/574 |
| 6,302,650 B1 * | 10/2001 | Williams et al. ............. 416/144 |
| 6,322,299 B1 | 11/2001 | Hartman ...................... 409/141 |
| 6,477,916 B2 | 11/2002 | Knorowski et al. ........ 74/573 R |
| 6,481,969 B2 | 11/2002 | Berry et al. ................. 416/145 |
| 6,608,733 B2 | 8/2003 | Elsing ..................... 360/99.08 |
| 6,931,861 B2 * | 8/2005 | Wagner ....................... 416/144 |

FOREIGN PATENT DOCUMENTS

| | | |
|---|---|---|
| EP | 0 153 887 B1 | 5/1987 |
| EP | 1 380 722 B1 | 1/2004 |
| JP | 10-281229 | 10/1998 |

* cited by examiner

*Primary Examiner*—Ninh H. Nguyen
(74) *Attorney, Agent, or Firm*—Ogilvy Renault LLP

(57) ABSTRACT

An apparatus for balancing a shaft of an aircraft engine preferably includes a plate and the use of standard fasteners. The plate provides mounting for a nose cone, and the balancing apparatus may be accessed from the front of the assembled engine.

20 Claims, 5 Drawing Sheets

APPARATUS AND METHOD OF BALANCING A SHAFT

FIELD OF THE INVENTION

The present invention generally relates to a balancing apparatus and method, and more particularly to an apparatus and method for balancing a shaft of an aircraft turbine engine.

BACKGROUND OF THE INVENTION

The main drive shafts of aircraft gas turbine engines are subject to mass imbalance due to manufacturing variations. The shafts must be balanced prior to assembly in the engine in order to reduce shaft vibration during engine operation.

Shaft imbalance is characterized by a magnitude of imbalance and an angular direction of imbalance. The magnitude of imbalance caused by an eccentric rotating mass, is a function of the weight of the mass and the radial distance of the mass from the axis of rotation. The angular direction of imbalance is determined by the angular position of the eccentric mass relative to an arbitrary reference direction.

Due to the subsequent operations of an aircraft turbine engine assembly, there is often a need for further balancing of the rotating parts when the engines are completed. Further balance adjustment however, is normally difficult due to the inaccessibility of the rotating parts and, quite frequently, the unbalance is so severe that it is necessary to strip the turbine engines for rebalancing.

Therefore, there is a need for an improved balancing apparatus for the shafts of aircraft turbine engines which will enable a shaft to be balanced accurately and simply and which will permit simplified final adjustment after the aircraft engine has become completely assembled.

SUMMARY OF THE INVENTION

One object of the present invention is to provide an apparatus and a method for balancing a shaft of an aircraft engine which is simple and allows for simplified final adjustment after the aircraft engine has been assembled.

In accordance with one aspect of the present invention, there is an apparatus provided for balancing a shaft of an aircraft engine which comprises a round plate and a plurality of standard mechanical fasteners. The round plate defines a first group of holes axially extending therethrough. The round plate is coaxially attached to the shaft at a forward end thereof. The standard mechanical fasteners are for selectively engaging in at least one of the holes of the first group which is determined in a shaft balancing test, thereby adding a selected balance weight to the plate in the determined hole, in order to balance the shaft.

The plate preferably also comprises a second group of holes axially extending therethrough for receiving mounting bolts therein for mounting a nose cone to the aircraft engine.

In accordance with another aspect of the present invention, there is an apparatus provided for an aircraft engine which comprises a nose cone of the aircraft engine, at least one balance weight element, and a member adapted to be centrally mounted to a forward end of a rotatable shaft of the aircraft engine. The member includes a plurality of mounting points by which the nose cone is mounted to the member, and further includes a plurality of attachment points to cooperate with the at least one balance weight element to retain the same to the member. The at least one weight element is retained in a selected one of the attachment points such that the shaft is rotationally balanced.

In accordance with a further aspect of the present invention, there is a method provided for balancing a shaft of an aircraft engine in which the shaft includes a mounting plate for mounting a nose cone to one side thereof. The method comprises steps of, with the nose cone dismounted, observing a rotational imbalance of the shaft; and accessing the mounting plate through a front opening of a casing of the aircraft engine to install and affix at least one standard fastener in one of a plurality of axial holes of the mounting plate determined during the observation step, thereby rotationally balancing the shaft.

The method preferably further comprises a step of selecting the at least one standard fastener from a plurality of standard fasteners having identical diameters and different lengths in order to provide a selected balance weight added to the plate.

An apparatus of the present invention is simply configured and has double functions. The plate is used as a balancing device to selectively carry balancing weights while being used as a mounting plate for supporting the nose cone in its operative position.

Another advantage of the present invention lies in that standard fasteners rather than specially configured balancing weights are used to balance the shaft of the aircraft engine, resulting in reduced manufacturing expenses of the aircraft engine. This advantage is even more significant when the present invention is applied to small aircraft turbine engines.

Other features and advantages of the present invention will be better understood with reference to a preferred embodiment described hereinafter.

BRIEF DESCRIPTION OF THE DRAWINGS

Reference will now be made to the accompanying drawings showing by way of illustration, a preferred embodiment in which.

DETAILED DESCRIPTION OF THE PREFERRED EMBODIMENTS

Figure 1:
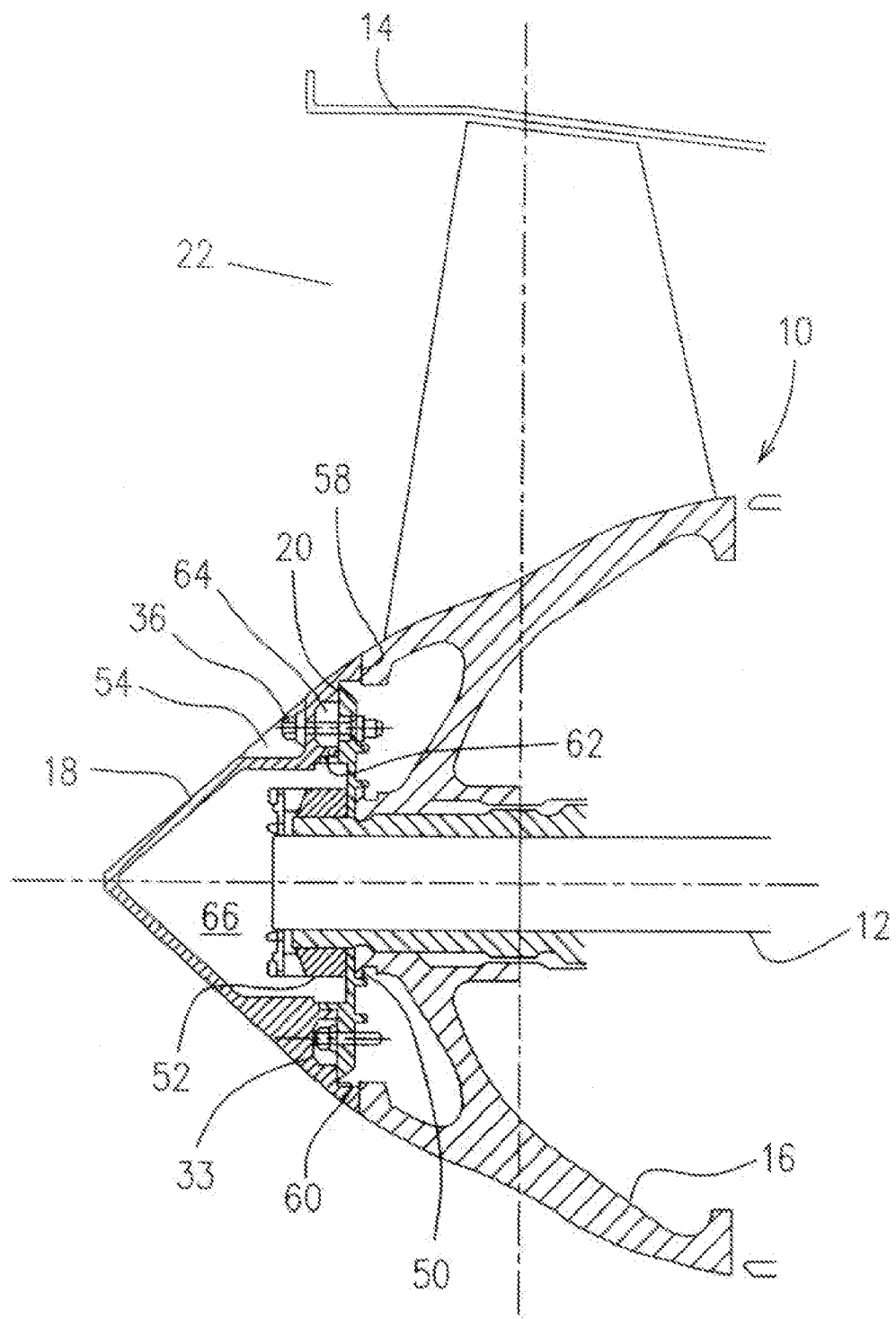
FIG. 1 is a partial cross-sectional view of an aircraft turbine engine, showing a nose cone mounting plate used as a balancing plate according to one embodiment of the present invention.
Figure 2:
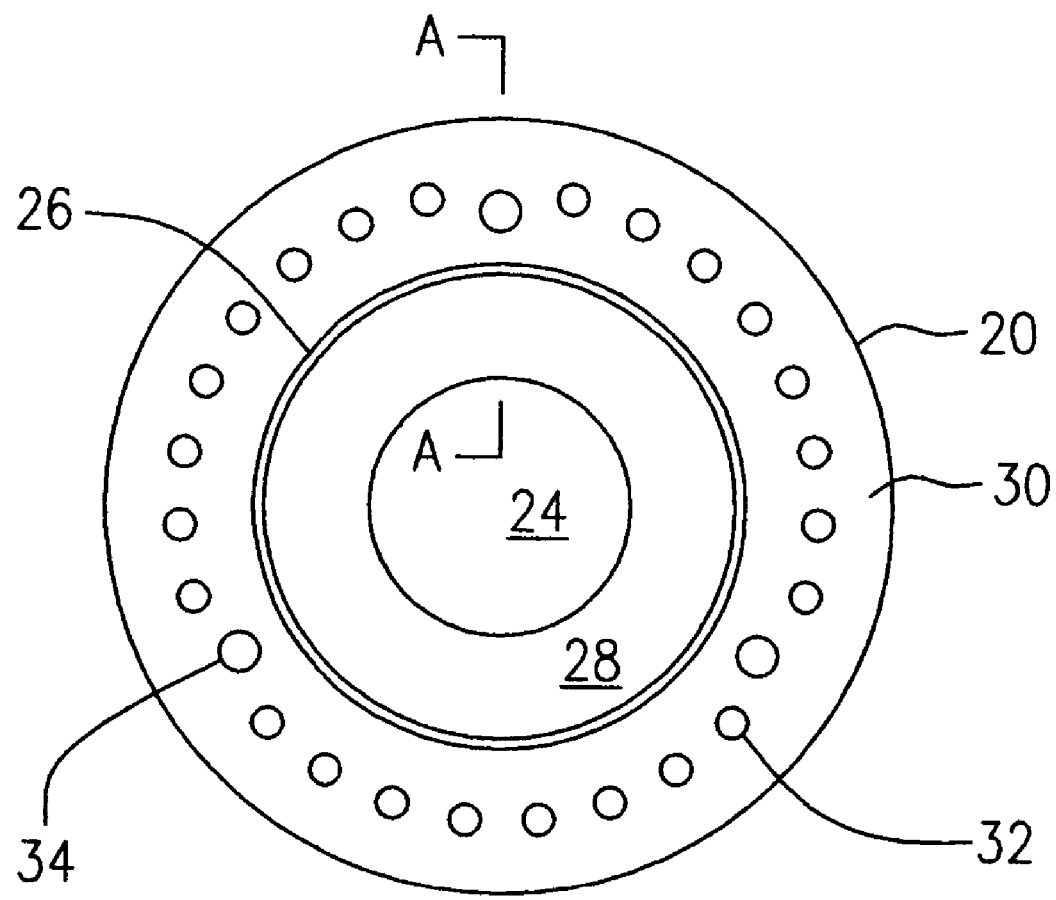
FIG. 2 is a front elevational view of the mounting plate for the nose cone used in the embodiment of FIG. 1.

Referring to the drawings, particularly FIGS. 1 and 2, an aircraft turbine engine generally indicated by numeral 10 includes a main shaft 12 rotatably supported within an engine casing 14 and being driven by a turbine rotor (not shown) of the engine. A fan integrated blade rotor (IBR) assembly 16 is mounted to a forward end of the main shaft 12 to be driven in rotation together therewith. A nose cone 18 is mounted to the forward end of the main shaft 12 by means of a mounting plate 20 such that an annular airflow inlet is defined at the front opening 22 of the engine casing 14, between the engine casing 14 and the fan IBR assembly 16 together with the nose cone 18. The nose cone 18 at its rear side defines a central cavity 66 therein to accommodate the forward end of the main shaft 12 and, the fan retaining nut 52 engaged with the forward end of the main shaft 12.

Figure 3:
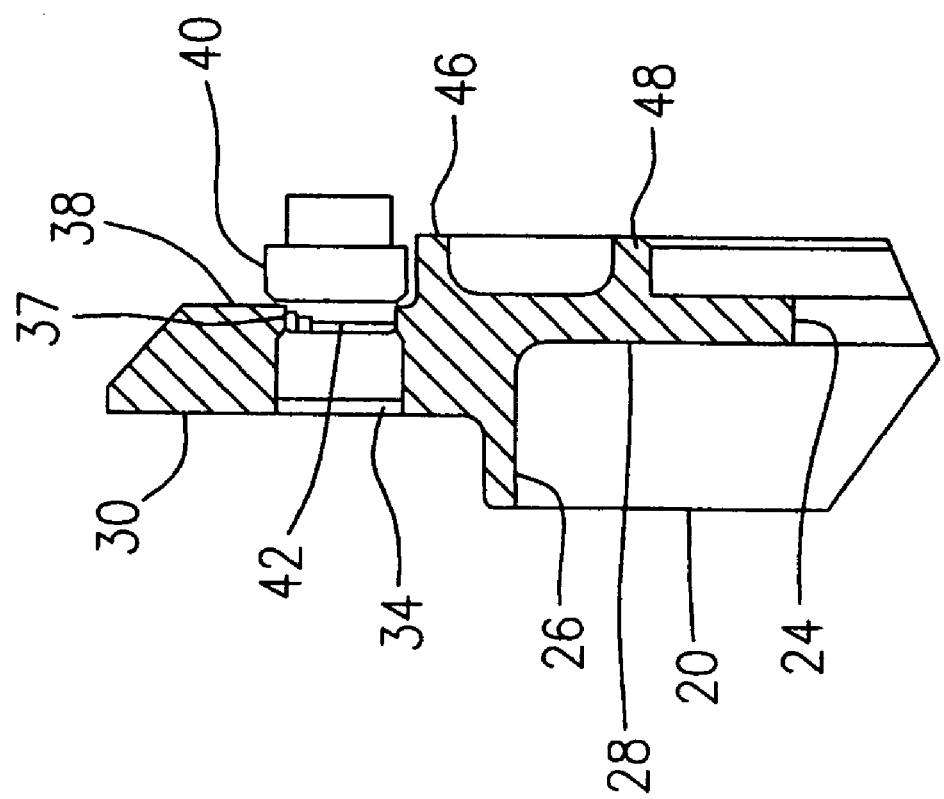
FIG. 3 is a partial cross-sectional view of the mounting plate of FIG. 2, taken along line A-A, showing the structural details thereof.

Referring to FIGS. 1, 2 and 3, the mounting plate 20 is a round plate preferably made of a turned steel, having a central aperture 24. A front annular rim 26 is disposed coaxially with respect to the round plate 20 and extends axially forwardly from the front side of the plate 20. The front annular rim 26 divides the plate 20 into a central portion 28 and an annular portion 30 much thicker than the central portion 28.

A first group of holes 32 are defined in the annular portion 30 of the plate 20, axially extending through the plate 20. The first group of holes 32 are tapped respectively to form inner threads therein for selectively engaging standard specification defined fasteners 33, such as Military Standard (MS) type screws, which will be further described hereinafter. The first group of the holes 32 are disposed in the circumference direction of the annular portion 30 of the plate 20, and are preferably spaced apart substantially equally one from another. The first group of holes. 32 are used as attachment points for adding balance weights to the mounting plate 20. Therefore, it is preferable to have a great number of the holes 32 disposed in a close relationship one to another in order to allow placement of a selected balance weight element in an accurate angular direction. However, the number of the holes 32 should be limited in order to not jeopardize a predetermined strength and stability of the mounting plate 20 for safely bearing the dynamic airflow loads on the nose cone 18 during engine operation, particularly during flight operation.

A second group of holes 34 are also defined in the annular portion 30 of the plate 20, equally and circumferentially spaced apart one from another. In this embodiment, three holes 34 spaced apart by 120 degrees extend axially through the plate 20, for receiving mounting bolts 36 therethrough. Each of the holes 34 includes a diametrically reduced section 37 at the opening thereof defined in the rear side 38 of the plate 20. A clinch nut 40 is attached to each hole 34 at the rear side 38 of the plate 20 such that the holes 34 with the attached clinch nuts 40 form a plurality of mounting points for mounting the nose cone 18 of FIG. 1 to the mounting plate 20. Each clinch nut 40 has a diametrically reduced front section 42 with thin front edges to be inserted into a hole 34 through the diametrically reduced section 37. Upon the insertion of the clinch nut 40 into the hole 34, the thin front edge of the front section 42 of the clinch nut 40 is forced to radially expand, thereby engaging the front section 42 of the clinch nut 40 in the diametrically reduced section 37 of the hole 34.

Figure 4:
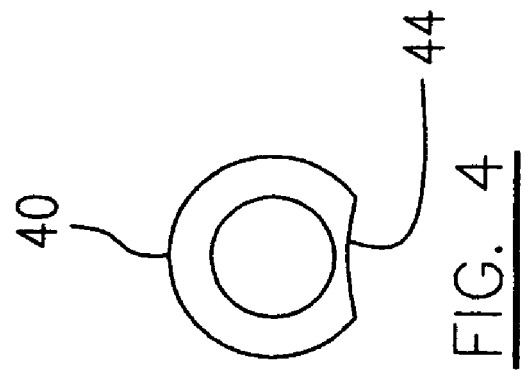
FIG. 4 is a rear elevational view of a clinch nut to be attached to the rear side of the mounting plate FIG. 3, showing the cut-away for restraining rotation of the nut.

In order to prevent the clinch nut 40 from rotating together with the mounting bolt 36 of FIG. 1 while the bolt 36 is being tightened, a portion of the clinch nut 40 at one side thereof is cut-away (as illustrated in FIG. 4) such that the cut away side 44 is configured and disposed closely with a section of a rear annular rim 46 of the plate 20. The annular rim 46 axially and rearwardly extends from the rear side 38 of the plate 20 and has a radius preferably smaller than the radial distance between the hole 34 and the center of the plate 20. The annular rim 46 is preferably disposed coaxially with the plate 20.

The plate 20 further includes a coaxially disposed rear annular rim 48 extending axially and rearwardly from the rear side 38 thereof. The diameter of the annular rim 48 is smaller than the diameter of the annular rim 46. The inner surface of the annular rim 48 is snuggly fit on a flange 50 of the fan IBR assembly 16 as shown in FIG. 1, to center the position of the mounting plate 20 when the mounting plate 20 is mounted to the forward end of the main shaft 12 The central aperture 24 of the mounting plate 20 has a diameter greater than the diameter of the main shaft 12 such that there is a clearance between the mounting plate 20 and the main shaft 12 when the mounting plate is mounted to the forward end of the main shaft 12 and is centered by the annular rim 48 surrounding the annular flange 50 of the fan IBR assembly 16.

As illustrated in FIG. 1, the mounting plate 20 when mounted on the forward end of the main shaft 12, is secured thereto by the fan retaining nut 52 which engages threads on the forward end of the main shaft 12 and is tightened to axially press the mounting plate 20 against the radial wall of the annular flange 50 of the fan IBR assembly 16. Thus, the mounting plate 20 is axially restrained between the fan retaining nut 52 and the IBR assembly 16. As a further advantage of the present invention, the mounting plate 20 acts as a washer to prevent damaging the fan IBR assembly 16 when torque is applied to the fan retaining nut 52 to tighten same.

Figure 5:
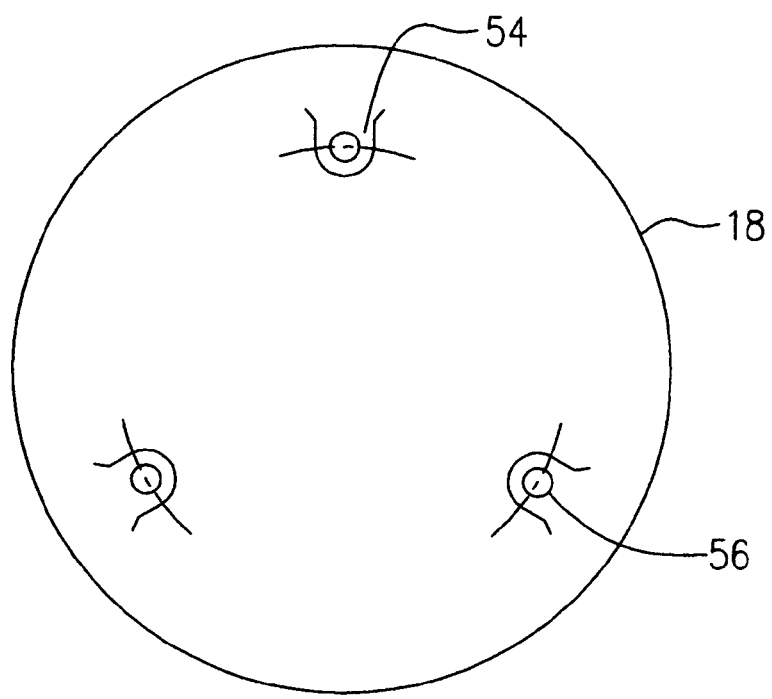
FIG. 5 is a front elevational view of the nose cone of FIG. 1, showing the mounting recesses thereon.
Figure 6:
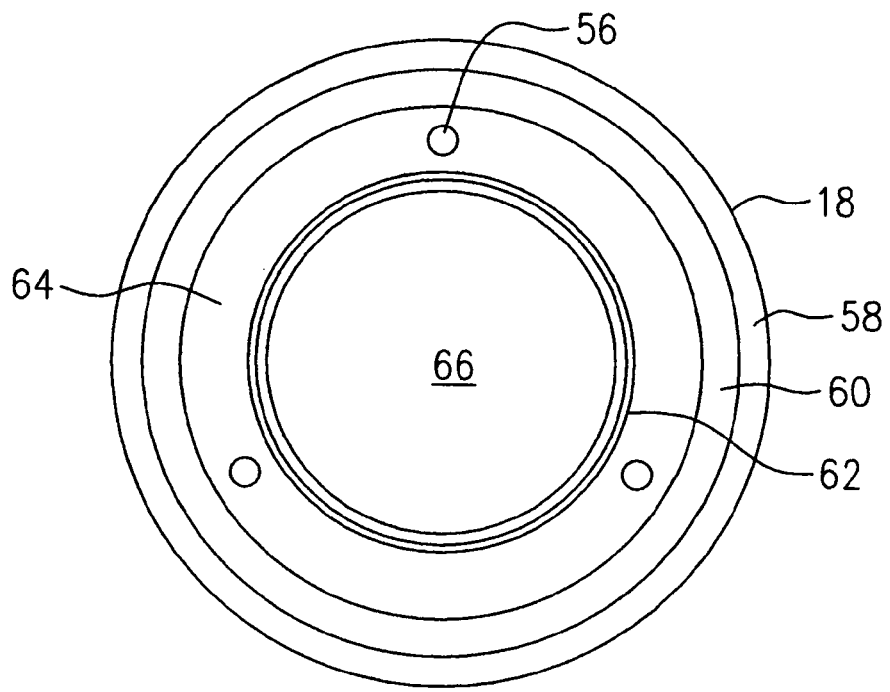
FIG. 6 is a rear elevational view of a nose cone of FIG. 1, showing the inner structure thereof.

Referring to FIGS. 1, 5 and 6, the nose cone 18 generally includes a hollow conical configuration contoured as a smooth convergent extension of the fan IBR assembly 16 when the nose cone 18 is mounted to the mounting plate 20. The nose cone 18 defines, for example, three recesses 54 on the front and outer side thereof, and forms a small portion of a radial surface (not indicated) as the bottom of each recess 54. The recesses 54 are disposed in accordance with the respective holes 34 in the mounting plate 20 so that a mounting hole 56 axially extending through the bottom of each recess 54 aligns with a corresponding mounting hole 34 in the mounting plate 20. The mounting bolt 36 can be inserted through the aligned mounting hole 56 in the nose cone 18 and the mounting hole 34 in the mounting plate 20, further into the attached clinching nut 40, and can be tightened to threadedly engage the clinching nut 40. The recess 54 provides a space for placing a tool to tighten the bolt 36 and the radially extending bottom surface of the recess 54 provides a flat base for the head of the mounting bolt 36 to abut.

The nose cone 18 defines a first outer annular radial surface 58 on the rearward and inner side thereof for contacting or being in a close relationship with the fan IBR assembly 16 such that the nose cone 18 covers the front end of the fan IBR assembly 16, thereby forming a smooth annular inner wall of the airflow inlet at the opening 22 of the engine casing 14. The nose cone 18 at the rearward end inner side thereof further includes a second annular radial surface 60 and an annular rim 62. A radial top surface of the annular rim 62 is preferably disposed in a radial plane determined by the second annular radial surface 60 such that both the radial top surface of the annular rim 62 and the second annular radial surface 60 abut the forward side of the mounting plate 20 at the outer annular portion 30 when the nose cone 18 is mounted to the mounting plate 20. The annular rim 62 includes an inner diameter corresponding to the outer diameter of the annular rim 26 of the mounting plate 20, and the annular rim 62 of the nose cone 18 is snuggly fitted around the rim 26 of the mounting plate 20 to center the nose cone 18 with respect to the main shaft 12.

An annular recess 64 is defined between the second annular radial surface 60 and the annular rim 62 with the mounting holes 56 extending axially through the bottom of the annular recess 64. The annular recess 64 is configured to correspond with the position of the holes 32 of the mounting plate 20 (see FIG. 2), and to accommodate one or more of the standard fasteners 33 which are selectively engaged in one or more of the tapped holes 32 for a rotational balance adjustment of the main shaft 12. The annular recess 64 is further preferably dimensioned to restrain axial movement of the fasteners 33 when the fasteners 33 are engaged in the tapped holes 32 of the mounting plate 20.

During a balance adjustment of the main shaft 12, the mounting bolts 36 are removed and the nose cone 18 is dismounted from the mounting plate 20. The engine 10 is then started for observation of any rotational imbalance of the main shaft 12 of the engine, which is well known in the art and will not be further described in detail. When the magnitude of the imbalance and the angular direction of imbalance of the main shaft 12 are observed, one or more of the tapped holes 32 are determined as balance weight attachment points and the amount of weight to be added is also determined.

Figure 8:
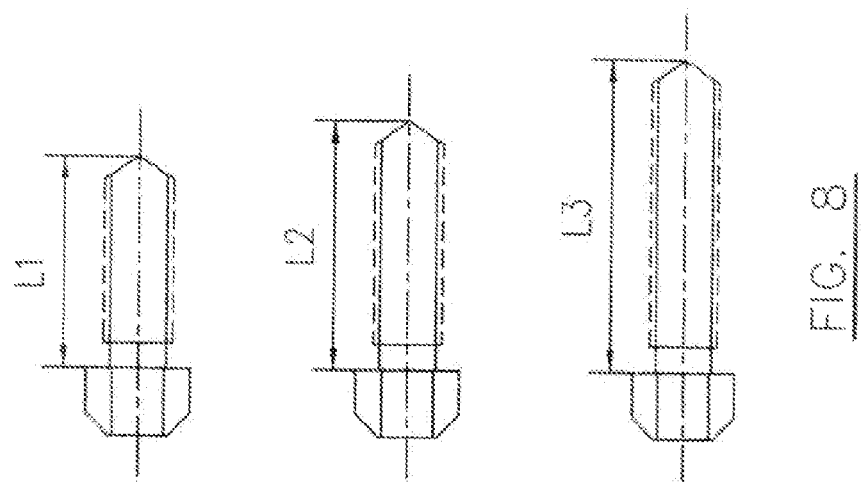
FIG. 8 is a schematic illustration of examples of a variety of standard fasteners having the same diameters and different lengths in order to provide a selected balance weight to be added to the balancing apparatus.

The next step is to select one or more standard fasteners 33 to act as the balance weights for engaging in the determined one or more tapped holes 32. The standard fasteners 33 preferably have identical diameters and threads but different lengths such as lengths L1, L2, and L3, as shown in FIG. 8. Selection of appropriate lengths of the standard fasteners 33 will provide a match of the amount of balance weights which has been determined.

Figure 7:
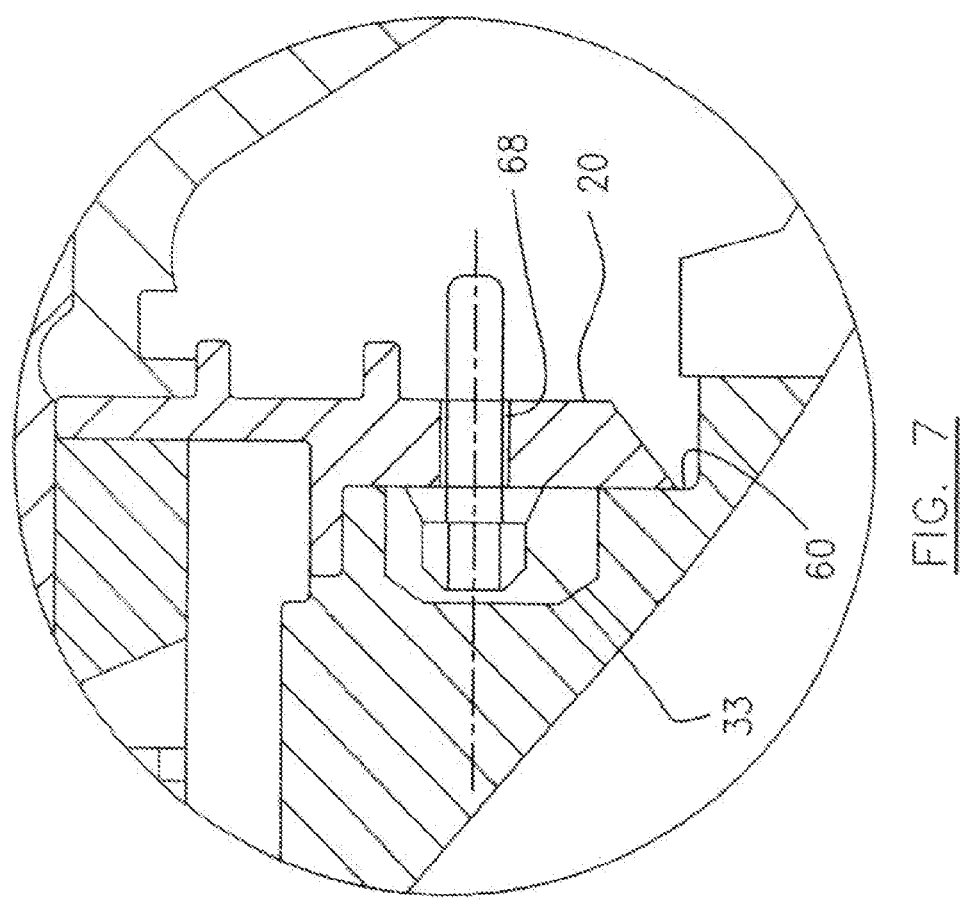
FIG. 7 is an enlarged portion of FIG. 1, showing an optional application of adhesive between the selected standard fastener and the balancing apparatus.

A further step of shaft balance adjustment is to access the mounting plate 20 through the front opening 22 of the engine casing 14 for installing and affixing the selected one or more standard fasteners 33 in the determined one or more tapped holes 32. An annular cavity (not indicated) defined within the fan IBR assembly 16 is disposed behind the mounting plate 20 in order to accommodate a rear section of the selected one or more standard fasteners 33, which extends out from the rear side of the mounting plate 20, regardless of the selected length of the standard fasteners 33. The selected one or more standard fasteners 33 are engaged in the determined one or more tapped holes 32 by means of threads. Nevertheless, it is preferred to apply adhesive 68 (see FIG. 7) to the selected one or more standard fasteners 33 and/or the determined one or more tapped holes 32 in order to provide additional retention of the fasteners 33 in the holes 32.

When the main shaft 12 is balanced, the nose cone 18 is placed back in position to cover the mounting plate 20 and the entire front end of the fan IBR assembly 16, and is then secured to the mounting plate 20 by, for example, the three mounting bolts 36. Each of the mounting bolts 36 extends axially through the aligned mounting holes 56 in the nose cone 18 and the mounting hole 34 in the mounting plate 20, and is engaged with the clinch nut 40 by means of threads when the mounting bolt 36 is tightened. The bottom of the annular recess 64 is in direct contact or in a close relationship with the heads of the respective mounting fasteners 33 to provide further additional retention of the fasteners 33.

Modifications and improvements to the above-described embodiment of the present invention may become apparent to those skilled in the art. The foregoing description is intended to be exemplary rather than limiting. For example, the mounting bolts 36 can be engaged within the mounting holes 34 of the mounting plate 20 by threads defined directly in the holes rather than the clinch nut 40 attached thereto. The clinch nut 40 attached to the hole 34 is restrained to prevent rotation by a section of the rim 46, in this embodiment. However, it can be restrained by any other means well known in the art, such as a pin or other well known stop member affixed to the mounting plate 20 and contacting the clinch nut 40 in a manner such as to prevent rotation thereof. The scope of the present invention is therefore intended to be limited solely by the scope of the appended claims.

We claim:

1. An apparatus for balancing a shaft of an aircraft engine comprising:
   a plate defining a first group of holes axially extending therethrough, the plate being co-axially attached to the shaft at a forward end of the shaft;
   a nose cone mounted to the plate; and
   at least one standard fastener engaging only the plate, the at least one standard fastener engaging the plate through at least one of the holes in the first group to thereby add an asymmetric balancing weight to the plate relative to a rotational axis of the shaft.

2. An apparatus as claimed in claim 1 wherein the plate further comprises a mounting system independent of the first group of holes for mounting a nose cone to the plate.

3. An apparatus as claimed in claim 2 wherein the mounting system comprises a second group of holes axially extending through the plate for receiving mounting bolts.

4. An apparatus as claimed in claim 3 wherein the plate comprises a plurality of clinch nuts each attached to respective holes of the second group on a rear surface of the plate for engaging the respective mounting bolts.

5. An apparatus as claimed in claim 4 wherein the plate comprises means on its rear surface for restraining rotation of the respective clinch nuts.

6. An apparatus as claimed in claim 2 wherein the plate comprises a position element on a forward surface thereof for co-axially aligning the nose cone with the shaft.

7. An apparatus as claimed in claim 1 wherein the plate comprises a position element on a rear surface thereof for co-axially aligning the plate with the shaft.

8. An apparatus as claimed in claim 7 wherein the plate comprises a central aperture for receiving the shaft extending through the aperture with clearance between the shaft and the aperture, the plate being affixed to the shaft by a fan retaining nut secured to the forward end of the shaft, the plate being axially restrained between the fan retaining nut and a radial wall of a fan rotor of the aircraft engine, and the position element on the rear surface of the plate for co-axially aligning the plate with the shaft contacting an axial surface of the fan rotor.

9. An apparatus as claimed in claim 1 wherein at least one standard fastener is selected from a variety of standard screws having identical diameters but different lengths such that one of the screws with a selected length can be engaged in the at least one of the holes of the first group as the selected balance weight added to the plate.

10. The apparatus as claimed in claim 1 wherein the nose cone defines a groove configured to accommodate a section of the at least one fastener projecting from the plate.

11. An apparatus for an aircraft engine comprising:
    a nose cone of the aircraft engine;
    at least one balance weight element;
    a member centrally mounted to a forward end of a rotatable shaft of the aircraft engine, the member including a mounting apparatus mounting the nose cone to the member and the member further including a balancing apparatus distinct from the mounting apparatus, the balancing apparatus of the member retaining the at least one balance weight element to the member independently of the nose cone while the nose cone is mounted to the member.

12. An apparatus as claimed in claim 11 wherein the at least one balance weight element is attached only to the member, from a forward side of the member.

13. An apparatus as claimed in claim 11 wherein the nose cone and the mounting apparatus are configured to permit the nose cone to be mounted to the member from a forward side of the member and cover the at least one balance weight element.

14. An apparatus as claimed in claim 11 wherein the member comprises a first positioning element to align the member with the shaft for the central mounting of the member to the shaft.

15. An apparatus as claimed in claim 11 wherein the member comprises a second positioning element to co-axially align the nose cone with the member.

16. A method of balancing a shaft of an aircraft engine, the shaft including a mounting plate for mounting a nose cone to one side of the mounting plate, the method comprising steps of:

with the nose cone unmounted, observing a rotational imbalance of the shaft; and accessing the mounting plate through a front opening of a casing of the aircraft engine to install and affix at least one standard fastener in one of a plurality of axial holes of the mounting plate determined during the observation step to thereby rotationally balance the shaft.

17. A method as claimed in claim 16 comprising a step of selecting the at least one standard fastener from a plurality of standard fasteners having identical diameters and different lengths to provide a selected balance weight added to the plate.

18. A method as claimed in claim 17 further comprising a step of applying adhesive between the selected at least one standard fastener and the plate.

19. A method as claimed in claim 17 further comprising a step of mounting the nose cone to the mounting plate after the shaft is rotationally balanced, a wall of the nose cone providing additional retention to the fastener received in the hole.

20. The apparatus as claimed in claim 11 wherein the nose cone defines a groove configured to accommodate a section of the at least one balancing weight element projecting from the member.

* * * * *